United States Patent [19]

Robinson

[11] 4,211,854
[45] Jul. 8, 1980

[54] BLOCK POLYMERS OF POLY(TETRAMETHYLENE OXIDE) AND TETRAHYDROFURAN/ALKYLENE OXIDE COPOLYMERS

[75] Inventor: Ivan M. Robinson, Wilmington, Del.

[73] Assignee: E. I. Du Pont de Nemours and Company, Wilmington, Del.

[21] Appl. No.: 935,508

[22] Filed: Aug. 21, 1978

[51] Int. Cl.$^2$ ............................................. C08L 37/00
[52] U.S. Cl. ..................................... 525/410; 528/405
[58] Field of Search ......................... 528/405; 260/823

[56] References Cited

U.S. PATENT DOCUMENTS 3,644,567  2/1972  Smith et al. ........................... 260/823

OTHER PUBLICATIONS

Noshay et al., *Block Copolymers, Overview & Critical Survey,* Academic Press, 1977, pp. 299–300.

Primary Examiner—Maurice J. Welsh

[57] ABSTRACT

Block polymers containing poly(tetramethylene oxide) as one of their constituent blocks and a random copolymer of tetrahydrofuran and one or more alkylene oxides as one or more of the other constituent blocks are useful in preparing polyurethanes and polyesters.

15 Claims, No Drawings

BLOCK POLYMERS OF POLY(TETRAMETHYLENE OXIDE) AND TETRAHYDROFURAN/ALKYLENE OXIDE COPOLYMERS

DESCRIPTION

1. Technical Field

This invention relates to block polymers. It is more particularly directed to block polymers containing, as one or more of its constituent blocks, a random copolymer of tetrahydrofuran and one or more alkylene oxides, and poly(tetramethylene oxide) as the other constituent block.

2. Background Art

Poly(tetramethylene oxide), also known as poly(tetramethylene ether glycol) or PTMEG, is a commodity in the chemical industry, widely used in the preparation of polyurethanes. Most commercial grades of PTMEG have high degrees of crystallinity—for example, a PTMEG having a number average molecular weight of about 1,000 (a common industrial grade) is a solid with about 50% crystallinity at 22° C., as measured by X-ray diffraction. This degree of crystallinity usually makes it necessary to melt the PTMEG before it is handled or processed, an energy-consuming step.

In addition, 1,4-butanediol, commonly used as a chain extension agent in the preparation of polyurethanes, is only sparingly soluble in PTMEG, and this can be the source of processing difficulties when these materials are so used.

These disadvantages are at a minimum when the block polymers of the invention are used in the preparation of polyurethanes. Block polymers of the invention comparable to common industrial grades of PTMEG show far less crystallinity; for example, a block polymer of the invention in which the poly(tetramethylene oxide) block has a number average molecular weight of about 1,000 and the THF-ethylene oxide blocks constitute 55%, by weight, of the total polymer, is a liquid at 22° C. In addition, the solubility of 1,4-butanediol is greater in the block polymers of the invention than it is in PTMEG. Moreover, a block polymer of the invention has lower viscosity than a PTMEG of comparable molecular weight, which makes it easier to handle.

DISCLOSURE OF THE INVENTION

The block polymers of the invention are linear hydroxyl-terminated block polymers represented by the structure

A—B or

A—B—A where
the A block is a random copolymer of tetrahydrofuran (THF) and one or more alkylene oxides, which block constitutes 5–95%, by weight, of the total polymer, and
the B block is poly(tetramethylene oxide), which block constitutes 5–95%, by weight, of the total polymer. The block polymers have number average molecular weights of 500–20,000, preferably 1,000–10,000.

By "copolymer" is meant an A block which arises from polymerization of two, three or four monomeric components.

By "alkylene oxide" is meant any alkylene oxide containing two or three carbon atoms in its oxide ring. It can be unsubstituted or substituted with, for example, alkyl or aryl groups, or with halogen atoms. Illustrative of such alkylene oxides are ethylene oxide, 1,2-propylene oxide; 1,3-propylene oxide; 1,2-butylene oxide; 1,3-butylene oxide; 3,3-bischloromethyl-1,3-propylene oxide; styrene oxide and epichlorohydrin.

Block polymers having the A—B—A configuration are preferred for their low crystallinity and low viscosity.

Also preferred are those block polymers of the invention having A blocks which are random copolymers of THF and ethylene oxide, THF and a propylene oxide, preferably 1,2-propylene oxide, or random terpolymers of THF, ethylene oxide and a propylene oxide.

Also preferred for their physical properties are those block polymers whose A blocks have THF/alkylene oxide weight ratios of 10/90–90/10, preferably 30/70–70/30.

In the preferred block polymers, the A blocks constitute 20–70%, by weight, of the total weight of the polymers, and the B blocks 30–80%.

The most preferred bock polymers of the invention are those having number average molecular weights of 1,000–10,000, whose A blocks are random copolymers of THF and ethylene oxide in which the THF/ethylene oxide weight ratio is 40/60–70/30 and which constitute 40–60% of the total weight of the block polymer.

The block polymers of the invention are made by catalytically and cationically copolymerizing THF and the desired alkylene oxide or oxides in the presence of PTMEG, using such proportions of the reactants as will give block polymers of either the A—B or the A—B—A type, with total number average molecular weights of 500–20,000, A blocks having THF/alkylene oxide weight ratios of 10/90–90/10, with the A blocks and the B blocks each constituting 5–95% of the total weight of the block polymers. Those skilled in this art will be able to select the proper amounts with no difficulty.

The preformed PTMEG used should have a number average molecular weight of 200–10,000. Those having number average molecular weights of 650–3,000 are preferred for their availability. The alkylene oxides can be any of those commercially available.

The catalyst used in preparing the block polymers of the invention can be any proton-donating cationic polymerization catalyst. Illustrative are boron trifluoride, boron trifluoride etherate, acid-activated montmorillonite clays such as that sold by Süd-Chemie of Munich, Germany, as Catalyst K-10, and strongly acidic cationic ion exchange resins.

Strongly acidic cationic ion-exchange resins are preferred for their activity and the ease with which they can be removed from the reaction mass. Preferred among such resins are those which are homopolymers of ethylenically unsaturated monomers (a) containing groups such that the final catalyst polymer will contain groups of the formula

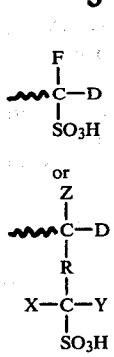

(1)

(2)

where

∿∿ represents the catalyst polymer chain or a segment thereof;

D is hydrogen, an aliphatic or aromatic hydrocarbon radical of 1-10 carbon atoms, a halogen atom or a segment of the catalyst polymer chain;

X and Y are hydrogen, halogen, an aliphatic or aromatic hydrocarbon radical of 1-10 carbon atoms or fluorine, but at least one must be fluorine;

R is a linear or branched linking group having up to 40 carbon atoms in the principal chain, and Z is hydrogen, halogen, an aliphatic or aromatic hydrocarbon radical of 1-10 carbon atoms or fluorine, or copolymers of any of the monomers in (a) with at least one other copolymerizable ethylenically unsaturated monomer (b).

The linking group defined by R in formula (2) can be a homogeneous one such as an alkylene radical, or it can be a heterogeneous one such as an alkylene ether radical. In the preferred catalyst polymers, this linking radical contains 1-20 carbon atoms in the principal chain. In the especially preferred catalyst polymers, R is a radical of the structure

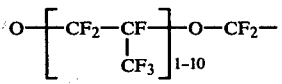

Illustrative of monomer (a) are such monomers as trifluorovinyl sulfonic acid, linear or branched chain vinyl monomers containing sulfonic acid group precursors and perfluoroalkylvinyl ethers containing sulfonic acid group precursors.

Illustrative of monomer (b) are such monomers as ethylene, styrene, vinyl chloride, vinyl fluoride, vinylidene fluoride, chlorotrifluoroethylene (CTFE), bromotrifluoroethylene (BTFE), vinyl ethers, perfluoroalkyl vinyl ethers, butadiene, tetrafluoroethylene (TFE) and hexafluoropropylene (HFP).

Homopolymerization and copolymerization to prepare the catalyst polymers can be done according to the procedures described in U.S. Pat. No. 3,784,399 to Grot, and the patents cited therein. Monomer ratios are selected to give the resulting catalyst polymers the proper equivalent weights.

The catalyst polymers have equivalent weights of 950-1,500, preferably 1,100-1,300. Equivalent weight of a catalyst polymer is that weight in grams which contains one gram equivalent weight of sulfonic acid groups, and can be determined by titration.

The catalyst polymers should be effectively free of functional groups, other than —SO₃H groups, which might interfere with the principal polymerization reaction. "Effectively free" means the catalyst polymers may contain a small number of such groups, but not so many that the reaction is affected adversely or the product contaminated. Illustrative of such groups are carboxyl groups, hydroxyl groups and amino groups.

Catalyst polymers whose polymer chains are of perfluorocarbon monomers are most preferred for use. Illustrative of such monomers are TFE, HFP, CTFE, BTFE and perfluoroalkyl vinyl ethers. Mixtures of monomers can also be used.

Even more preferred as catalyst polymers are copolymers of TFE or CTFE and a perfluoroalkyl vinyl ether containing sulfonic acid group precursors. Most preferred in this case are copolymers of TFE or CTFE and a monomer represented by the structure

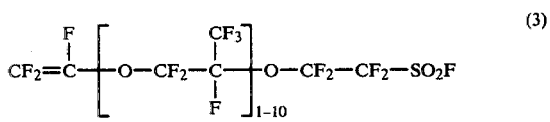

These catalyst copolymers are prepared in the sulfonyl fluoride form and are then hydrolyzed to the acid form as described in U.S. Pat. No. 3,692,569.

Most preferred as catalyst polymers are copolymers of TFE and monomers of formula (3) in which the respective monomer unit weight ratios are 25/75-50/50. Such copolymers, having equivalent weights of 1,100, 1,150, 1,500 and 1,900 are sold by E. I. du Pont de Nemours and Company as Nafion ® perfluorosulfonic acid resin.

To prepare a block polymer of the invention, a suitable amount of PTMEG is charged to a reactor and to this is then added the catalyst. In the case of boron trifluoride or boron trifluoride etherate, the amount used is 0.01-1%, by weight of the PTMEG; in the case of clays or ion-exchange resins, the amount used is 0.5-60%, by weight of the PTMEG.

The resulting solution or slurry is heated to and held at 35°-70° C., with stirring, while the proper amount of THF and an alkylene oxide, alone or in admixture, in the proper ratio to one another, are fed into the reactor over a period of 4-8 hours. When addition of the THF and alkylene oxide is finished, the catalyst is separated from the reaction mass by filtration or decantation and residual THF and volatile byproducts are removed from the reaction mass by vacuum stripping or other suitable means. If BF₃ or its etherate is used as the catalyst, it should be first neutralized by a conventional procedure such as treatment with a basic ion exchange resin, and then removed by filtration or decantation. Preparation of the block polymer is then complete.

Number average molecular weight, referred to in the foregoing and following descriptions, is determined by hydroxyl number.

EXAMPLES

In the following examples, all parts are by weight.

EXAMPLE 1 (BEST MODE)

Fifty parts of PTMEG (number average molecular weight 1,000) and 28 parts of Nafion ® perfluorosulfonic acid resin (equivalent weight 1,900) were charged to a reactor. The resulting slurry was heated to and held at 55°-60° C., with stirring, while a mixture of 190 parts of THF and 90 parts of ethylene oxide was fed in at the rate of about 0.8 part per minute.

When the feed was finished, the catalyst was allowed to settle and the reaction mass was decanted. Unreacted THF and volatile byproducts were then removed from the reaction mass by first treating it in a steam-heated rotary evaporator at a pressure of about 200 mm of mercury and then holding it under a vacuum of 5-10 mm of mercury at 90° C. for about 2 hours, to give 246 parts of a block polymer of the A—B—A type, in which the B block was poly(tetramethylene oxide) and the A block was a random copolymer of THF and ethylene oxide. The block polymer had the following characteristics:

(1) Number average molecular weight—2,200
(2) THF/alkylene oxide weight ratio in the A block—54/46
(3) Percent of total block polymer weight-A block—55%
(4) Percent of total block polymer weight-B block—45%
(5) Liquid at 22° C.

EXAMPLE 2

One hundred parts of PTMEG (number average molecular weight 1,000) and 40 parts of dry Catalyst K-10 were charged to a reactor. The resulting slurry was heated to and held at 50°-55° C., with stirring, while a mixture of 170 parts of THF, 65 parts of propylene oxide and 45 parts of ethylene oxide was fed in at the rate of about 0.8 part per minute.

After all of the feed mixture had been added, the catalyst was removed from the reaction mass by filtration. Unreacted THF and volatile byproducts were then removed in a rotary evaporator as in Example 1, to give a block polymer of the A—B—A type, in which the B block was poly(tetramethylene oxide) and the A block was a random terpolymer of THF, ethylene oxide and propylene oxide. The block polymer had the following characteristics:

(1) THF/ethylene oxide/propylene oxide weight ratio in the A block—49/21/30
(2) Percent of total block polymer weight-A block—68%
(3) Percent of total block polymer weight-B block—32%
(4) Liquid at 22° C.

INDUSTRIAL APPLICABILITY

The block polymers of the invention can be used in place of conventional polyether or polyester glycols to prepare polyurethanes according to methods well known in the art, which employ the reaction of polyols with appropriate di- or polyisocyanates and customary chain extenders.

The block polymers can also be used to prepare polyesters according to well-known methods in which polyols are reacted with dibasic acids or their esters.

What is claimed is:

1. A linear hydroxyl-terminated block polymer represented by the structure

A—B or

A—B—A where
   the A block is a random copolymer of THF and one or more alkylene oxides containing two or three carbon atoms in its oxide ring, which block constitutes 5-95%, by weight, of the total polymer, and
   the B block is poly(tetramethylene oxide), which block constitutes 5-95%, by weight, of the total polymer, the polymer having a number average molecular weight of 500-20,000.

2. The block polymer of claim 1 having a number average molecular weight of 1,000-10,000.

3. The block polymer of claim 1 wherein the alkylene oxide in the A block is ethylene oxide.

4. The block polymer of claim 1 wherein the alkylene oxide in the A block is a propylene oxide.

5. The block polymer of claim 1 wherein the A block is a random terpolymer of THF, ethylene oxide and propylene oxide.

6. The block polymer of claim 1 wherein the A block has a THF/alkylene oxide weight ratio of 10/90-90/10.

7. The block polymer of claim 5 wherein the THF/alkylene oxide weight ratio is 30/70-70/30.

8. The block polymer of claim 1 wherein the A block constitutes 20-70% of the total weight of the polymer and the B block constitutes 30-80% of the total weight of the polymer.

9. The block polymer of claim 3 wherein the A block has a THF/EO weight ratio of 40/60-70/30 and constitutes 40-60% of the total weight of the polymer, and the B block constitutes 40-60% of the total weight of the polymer, the polymer having a number average molecular weight of 1,000-10,000.

10. A process for catalytically preparing the block polymer of claim 1, the process comprising bringing together, under conditions suitable for reaction, a preformed poly(tetramethylene ether glycol), tetrahydrofuran, one or more alkylene oxides and a cationic proton-donating polymerization catalyst.

11. The process of claim 10 wherein the catalyst is a homopolymer of an ethylenically unsaturated monomer (a) containing groups such that the final catalyst polymer will contain groups of the formula

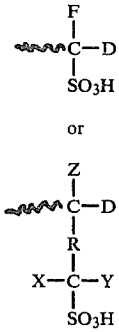

where
   ∿∿ represents the catalyst polymer chain or a segment thereof;
   D is hydrogen, an aliphatic or aromatic hydrocarbon radical of 1-10 carbon atoms, a halogen or a segment of the catalyst polymer chain;
   X and Y are hydrogen, halogen, an aliphatic or aromatic hydrocarbon radical of 1-10 carbon atoms or fluorine, but at least one of X or Y must be fluorine;

R is a linear or branched linking group having up to 40 carbon atoms in the principal chain; and Z is hydrogen, halogen, an aliphatic or aromatic hydrocarbon radical of 1-10 carbon atoms or fluorine;

or a copolymer of monomer (a) with at least one other copolymerizable ethylenically unsaturated monomer (b), the homopolymer or copolymer being effectively free of functional groups which interfere with the reaction.

12. The process of claim 11 in which the catalyst is a copolymer of monomer (a) and a perfluorocarbon monomer.

13. The process of claim 12 in which the catalyst is a copolymer of TFE or CTFE and a monomer represented by the structure

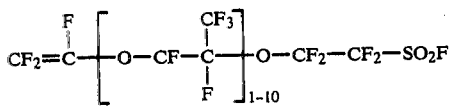

the TFE or CTFE and monomer units being present in weight ratios of 25-75/50-50, respectively, the catalyst copolymer being hydrolyzed to the acid form.

14. The process of claim 10 wherein the catalyst is an acid-activated montmorillonite clay.

15. The process of claim 10 wherein the catalyst is boron trifluoride or boron trifluoride etherate.